Patented Oct. 19, 1954

2,692,273

UNITED STATES PATENT OFFICE 2,692,273

STEROIDS

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application May 20, 1953,
Serial No. 356,316

8 Claims. (Cl. 260—397.4)

This invention relates to steroids and more particularly to the novel androstane derivatives, 17β-hydroxyandrostane-3,6-dione, 17β-hydroxy-10-normethylandrostane-3,6-dione, and esters thereof, which may be represented by the following formula:

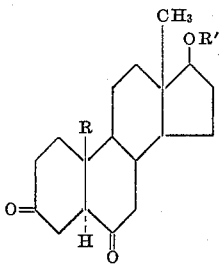

wherein R is hydrogen or methyl and R' is hydrogen or an acyl radical, preferably of a hydrocarbon carboxylic acid, especially those acids containing from one to eight carbon atoms, inclusive.

This invention is a continuation-in-part of our prior-filed applications Serial No. 180,496, filed August 19, 1950, now abandoned; Serial No. 272,944, filed February 23, 1952, now Patent No. 2,602,769, issued July 8, 1952; and Serial No. 297,242, filed July 5, 1952.

It is an object of this invention to provide the novel 17β-hydroxyandrostane-3,6-dione, 17β-hydroxy-10-normethylandrostane-3,6-dione, and esters thereof. Other objects will be apparent those skilled in the art to which this invention pertains.

17β - hydroxyandrostane-3,6 - dione, 17β - hydroxy - 10 - normethylandrostane - 3,6 - dione, and esters thereof are useful as chemical intermediates and have pharmacological activity per se. They exhibit adrenocorticotropic hormonal and anabolic properties. Oxidation of 17β-hydroxyandrostane-3,6-dione with chromium trioxide produces the known androstane-3,6,17-trione [Balant and Ehrenstein, J. Org. Chem. 17, 1587 (1952)]. Similarly, oxidation of 17β-hydroxy - 10 - normethylandrostane -3,6- dione produces 10-normethylandostane-3,6,17-trione.

The novel 17β-hydroxy steroids of the present invention may be prepared from testosterone or 10-normethyltestosterone by the action of a culture of fungus, particularly of the order Mucorales and genus Rhizopus, especially the species *Rhizopus reflexus*. *Rhizopus arrhizus* or *nigricans* may also be used.

Esterification to produce the novel esters of this invention may be accomplished by admixing 17β - hydroxyandrostane - 3,6 - dione or 17β - hydroxy-10-normethylandrostane-3,6-dione with an acylating agent such as, for example, ketene of a selected acid, an acid, acid chloride or acid anhydride, or other known acylating agent, usually in a solvent such as, for example, pyridine or the like, or an inert solvent, including solvents, such as benzene, toluene, ether, and the like, and heating or allowing to stand at a temperature between about zero degrees centigrade and the boiling point of the reaction mixture, usually at about room temperature, for a period between about one-half hour and about 96 hours. The time of reaction as well as the temperature at which the reaction is carried out, the acylating agent, and the ratio of reactants may be varied. The reaction mixture is suitably poured into ice or cold water and the product recovered in an appropriate solvent which is thereafter washed with successive portions of a mildly basic solution and water to obtain a solution of the product which is essentially neutral.

In some instances, the product may crystallize from the reaction mixture, in which case it may be advantageous to separate the product by filtration or other means, wash with water, and thereafter purify by conventional procedure, such as, for example, by recrystallization from a suitable solvent or by chromatographic purification, as deemed necessary.

The following examples are illustrative of the process and products of the present invention, but are not to be construed as limiting.

*Example 1.—17β-hydroxyandrostane-3,6-dione*

A medium was prepared of twenty grams of Edamine enzymatic digest of lactalbumin, three grams of corn steep liquor and fifty grams of technical dextrose dilute to one liter with tap water and adjusted to a pH of 4.5 to 4.8. To 120 liters of this sterilized medium, there was added an inoculum of *Rhizopus reflexus*, American Type Culture Collection Number 1225, and the medium was incubated for 24 hours at a temperature of 28 degrees centigrade using a rate of aeration and stirring such that the oxygen uptake was 8 to 12 millimoles per hour per liter of $Na_2SO_3$ according to the method of Cooper, Fernstrom, and Miller, Ind. Eng. Chem. 36 504 (1944). To this medium, containing a 24-hour growth of *Rhizopus reflexus*, was added 72 grams of testosterone, dissolved in one liter of absolute ethanol, to provide a suspension of steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation.

The solvent-free extractives, weighing 192 grams, dissolved in 1850-milliliters of benzene, were chromatographed over a column containing 2,560 grams of alumina which had been washed with hydrochloric acid and activated by heating to a temperature of 120 degrees centigrade prior to use. The material was then developed with 1850-milliliter volumes of solvents in accordance with Table I.

TABLE I

| Fraction | Solvent |
|---|---|
| 1 | benzene. |
| 2 | Do. |
| 3 | benzene-ether 9:1. |
| 4 | Do. |
| 5 | benzene-ether 1:1. |
| 6 | Do. |
| 7 | ether. |
| 8 | Do. |
| 9 | ether-chloroform 19:1. |
| 10 | Do. |
| 11 | ether-chloroform 9:1. |
| 12 | Do. |
| 13-16 | Do. |
| 17-20 | chloroform. |
| 21-24 | chloroform-acetone 19:1. |
| 25-30 | chloroform-acetone 9:1. |
| 31-36 | chloroform-acetone 1:1. |
| 37-42 | acetone. |
| 43-44 | acetone-methanol 9:1. |
| 45-47 | acetone-methanol 1:1. |
| 48-50 | methanol. |

Fractions 10 to 25, inclusive, from Table I, were combined and evaporated, yielding 59.5 grams of solid. An aliquot of 0.6 gram (about one hundredth) of this solid was rechromatographed over thirty grams of alumina which had previously been washed with hydrochloric acid and dried at a temperature of 120 degrees centigrade, with sixty-milliliter portions of solvents in accordance with Table II.

TABLE II

| Fraction | Solvent |
|---|---|
| 1 | benzene. |
| 2 | benzene-ether 19:1. |
| 3 | benzene-ether 9:1. |
| 4 | benzene-ether 1:1. |
| 5 | ether. |
| 6 | ether-chloroform 19:1. |
| 7 | ether-chloroform 9:1. |
| 8 | ether-chloroform 1:1. |
| 9 | chloroform. |
| 10 | chloroform-acetone 19:1. |
| 11 | chloroform-acetone 9:1. |
| 12 | chloroform-acetone 1:1. |
| 13 | acetone. |
| 14 | methanol. |

Fractions 4 and 5, from Table II, were combined and the eluant evaporated to yield 188 milligrams of solid. This material was dissolved in dimethylformamide and precipitated by the dropwise addition of water until the solution appeared turbid. After cooling for two hours, the crystals which had formed in the solution were filtered off, washed with fifty percent aqueous dimethylformamide, and then with ether to yield 25 milligrams of crude 17β-hydroxyandrostane - 3,6 - dione. Recrystallization of 4.67 grams of crude 17β-hydroxyandrostane-3,6-dione from acetone-ethylacetate solution, followed by recrystallization from methylene dichloride, gave pure 17β-hydroxyandrostane-3,6-dione of melting point 233 to 234 degrees centigrade.

Analysis.—Percent calculated for $C_{19}H_{28}O_3$: C, 74.76; H, 9.03. Found: C, 74.96; H, 9.27.

*Example 2.—17β-hydroxy-10-normethylandrostane-3,6-dione*

A medium was prepared of five grams of soy flour, two grams of dextrose, and five grams each of debittered brewer's yeast extract, sodium chloride, and potassium dihydrogen phosphate diluted with tap water to 1000 milliliters and adjusted with hydrochloric acid to a pH of 4.5. This sterilized medium was inoculated with spores of *Rhizopus reflexus* ATCC 1225, from a malt agar slant, and incubated for 24 hours at a temperature of 28 degrees centigrade using agitation and aeration corresponding to an oxygen uptake of eight millimoles per hour per liter of $Na_2SO_3$ according to Cooper, Fernstrom, and Miller, Ind. Eng. Chem. 36, 504 (1944). To this medium, containing a 24-hour growth of *Rhizopus reflexus*, was added 200 milligrams of 10-normethyltestosterone dissolved in ten milliliters of acetone to produce a suspension of the steroid in the culture. After an additional 24-hour period of incubation under the same conditions of temperature and aeration, the beer and mycelium were extracted as in Example 1. The concentrated extract was subjected to separation by paper chromatography using a propylene glycoltoluene system to yield 17β-hydroxy-10-normethylandrostane-3,6-dione.

*Example 3.—17β-hydroxy-10-normethylandrostane-3,6-dione*

Otherwise in the manner of Example 2, similar results were produced by fermentation of *Rhizopus reflexus* in a medium consisting of twenty grams of corn steep liquor, twenty grams of dextrin, one gram of potassium dihydrogen phosphate, two grams of sodium nitrate, five grams of magnesium sulfate heptahydrate, 0.2 gram of potassium chloride, 0.01 gram of ferrous sulfate heptahydrate, and 2.5 grams of sodium acetate diluted with tap water to 1000 milliliters and adjusted with concentrated sodium hydroxide to a pH of 7.0.

*Example 4.—17β-acetoxyandrostane-3,6-dione*

To 100 milligrams of 17β-hydroxyandrostane-3,6-dione, dissolved in two milliliters of barium oxide-dried pyridine, was added one milliliter of redistilled acetic anhydride and the reaction mixture maintained at room temperature for sixteen hours. The reaction mixture was then diluted to eighty milliliters with ice water and thereafter refrigerated for 24 hours. The thus-produced crystalline precipitate of 17β-acetoxyandrostane-3,6-dione was filtered, washed with four one-milliliter portions of ice water and thereafter dried in a vacuum at sixty degrees centigrade. The dry product was dissolved in five milliliters of hot methanol, the resulting solution was filtered and then diluted with 0.5 milliliter of water to precipitate crystals which were filtered, washed with fifty percent aqueous methanol, and thereafter air-dried to produce 17β-acetoxyandrostane-3,6-dione of melting point 185 to 186 degrees centigrade.

Analysis.—Percent calculated for $C_{21}H_{30}O_4$: C, 72.80; H, 8.73. Found: C, 72.88; H, 8.55.

Example 5.—17β-formyloxyandrostane-3,6-dione

Otherwise in the manner of Example 4, 17β-formyloxyandrostane-3,6-dione is prepared by reacting 17β-hydroxyandrostane-3,6-dione with an excess of formic acid in place of the acetic anhydride and pyridine used in Example 4.

Example 6.—17β-propionoxyandrostane-3,6-dione

In the same manner as given in Example 4, 17β-propionoxyandrostane-3,6-dione is prepared by reacting 17β - hydroxyandrostane-3,6-dione with propionic anhydride in pyridine.

Example 7.—17β-(β-cyclopentyl)-propionoxyandrostane-3,6-dione

In the same manner as given in Example 4, 17β - (β-cyclopentyl) - propionoxyandrostane-3,6-dione is prepared by reacting 17β-hydroxyandrostane-3,6-dione with β-cyclopentylpropionyl chloride in pyridine.

Example 8.—17β-benzoyloxyandrostane-3,6-dione

In the same manner as given in Example 4, 17β-benzoyloxyandrostane-3,6-dione is prepared by reacting 17β-hydroxyandrostane-3,6-dione with more than about two molar equivalents of benzoyl chloride in pyridine.

Example 9.—17β-formyloxy-10-normethylandrostane-3,6-dione

In the same manner as given in Example 4, 17β - formyloxy - 10 - normethylandrostane-3,6-dione is prepared by reacting 17β-hydroxy-10-normethylandrostane-3,6-dione with an excess of formic acid, instead of the acetic anhydride and pyridine used in Example 4.

Example 10.—17β-acetoxy-10-normethylandrostane-3,6-dione

In the same manner as given in Example 4, 17β - acetoxy - 10 - normethylandrostane - 3,6-dione is prepared by reacting 17β hydroxy-10 normethylandrostane-3,6-dione with more than about two equivalents of acetic anhydride in pyridine.

Example 11. — 17β-propionyloxy-10-normethylandrostane-3,6-dione

In the same manner as given in Example 4, 17β - propionyloxy-10-normethylandrostane-3,6-dione is prepared by reacting 17β-hydroxy-10-normethylandrostane-3,6-dione with propionic anhydride in pyridine.

Example 12. — 17β-(β-cyclopentyl)-propionoxy-10-normethylandrostane-3,6-dione

In the same manner as given in Example 4, 17β - (β-cyclopentyl)-propionoxy-10-normethylandrostane-3,6-dione is prepared by reacting 17 β- hydroxy - 10 - normethylandrostane - 3,6-dione cyclopentylpropionyl chloride in pyridine.

Example 13.—17β-benzoyloxy-10-normethylandrostane-3,6-dione

In the same manner as given in Example 4, 17β - benzoyloxy - 10 - normethylandrostane-3,6-dione is prepared by reacting 17β-hydroxy-10-normethylandrostane-3,6-dione with benzoyl chloride in pyridine.

In a similar manner, other esters of 17β-hydroxyandrostane-3,6-dione and 17β-hydroxy-10-normethylandrostane-3,6-dione are prepared according to acylation procedures as illustrated above or by reaction with ketene ketenes of selected acids, selected acids, acid anhydrides, or acid halides, e. g., chlorides or bromides, in an organic solvent such as pyridine or the like. Representative esters of 17β-hydroxyandrostane-3,6 - dione and 17β - hydroxy - 10 - normethylandrostane-3,6-dione thus-prepared include one to eight carbon atom carboxylic acid esters of saturated or unsaturated, aliphatic, carbocyclic, cycloaliphatic, aryl, aryl-alkyl-, alkaryl-, mono-, di- or polycarboxylic acids having less than nine carbon atoms, which form ester groups such as, for example, formyloxy, acetoxy, propionoxy, dimethylacetoxy, trimethylacetoxy, butyryloxy, valeryloxy, hexanoyloxy, heptanoyloxy, octanoyloxy, benzoyloxy, phenylacetoxy, toluoyloxy, cyclopentylformyloxy, α- and β-cyclopentylpropionoxy, acrylyloxy, cyclohexylformyloxy, the half and di-esters of polybasic acids such as malonic, maleic, succinic, glutaric and adipic acids, and the like. The acids may also contain non-interfering substituents, such as mono or poly halo, chloro, bromo, hydroxy, methoxy, and the like if desired.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A 3,6-diketoandrostane represented by the structural formula:

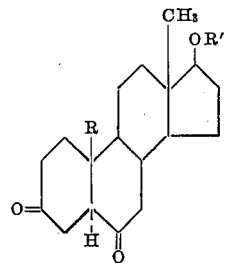

wherein R is selected from the group consisting of hydrogen and methyl, and wherein R' is selected from the group consisting of hydrogen and hydrocarbon carboxylic acyl radicals containing less than nine carbon atoms.

2. 17β-hydroxyandrostane-3,6-dione.

3. 17β - hydroxy-10-normethylandrostane-3,6-dione.

4. A 17β-acyloxyandrostane-3,6-dione represented by the structural formula:

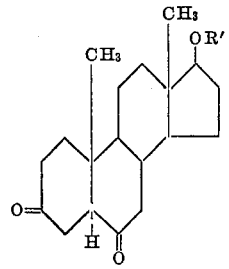

wherein R' is a hydrocarbon carboxylic acyl radical containing less than nine carbon atoms.

5. 17β-acetoxyandrostane-3,6-dione.
6. 17β-propionyloxyandrostane-3,6-dione.
7. A 17β-acyloxy-10-normethylandrostane-3,6-dione represented by the structural formula:

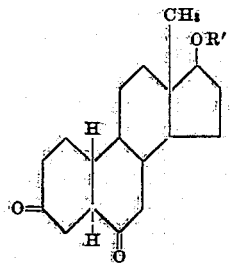

wherein R' is a hydrocarbon carboxylic acyl radical containing less than nine carbon atoms.

8. 17β-(β-cyclopentyl)-propionyloxy-10-normethylandrostane-3,6-dione.

No references cited.